US011295086B1

(12) United States Patent
Yenney et al.

(10) Patent No.: US 11,295,086 B1
(45) Date of Patent: Apr. 5, 2022

(54) SYSTEM MONITORING BASED ON SOCIAL MEDIA

(71) Applicant: INTUIT INC., Mountain View, CA (US)

(72) Inventors: Gregory Dean Yenney, Mountain View, CA (US); Radha Damera, Woodland Hills, CA (US); Chandana Davuluri, Santa Clarita, CA (US); Michael Han, Woodland Hills, CA (US); Vaishnavi Rajagopal, Oak Park, CA (US); Vinayak Thakkar, Woodland Hills, CA (US); Suman Malla, Simi Valley, CA (US)

(73) Assignee: INTUIT INC., Mountain View, CA (US)

( * ) Notice: Subject to any disclaimer, the term of this patent is extended or adjusted under 35 U.S.C. 154(b) by 288 days.

(21) Appl. No.: 16/177,468

(22) Filed: Nov. 1, 2018

(51) Int. Cl.
*G06F 40/30* (2020.01)
*G06N 20/00* (2019.01)
*G06F 16/35* (2019.01)

(52) U.S. Cl.
CPC .......... *G06F 40/30* (2020.01); *G06F 16/353* (2019.01); *G06N 20/00* (2019.01)

(58) Field of Classification Search
None
See application file for complete search history.

(56) References Cited

U.S. PATENT DOCUMENTS

| 8,166,061 | B2 * | 4/2012 | Armstrong | H04L 67/306 |
| | | | | 707/769 |
| 8,676,891 | B2 * | 3/2014 | Su | G06F 3/04817 |
| | | | | 709/204 |
| 10,015,128 | B2 * | 7/2018 | Brunn | G06F 16/2228 |
| 10,771,424 | B2 * | 9/2020 | Kapoor | G06F 16/3346 |
| 11,074,500 | B2 * | 7/2021 | Volkova | G06N 3/08 |
| 2014/0067948 | A1 * | 3/2014 | Campbell | H04N 21/44218 |
| | | | | 709/204 |
| 2014/0088944 | A1 * | 3/2014 | Natarajan | G06F 30/20 |
| | | | | 703/13 |
| 2016/0142891 | A1 * | 5/2016 | Virhia | G06Q 10/00 |
| | | | | 340/870.07 |
| 2017/0351560 | A1 * | 12/2017 | Smith, Jr | G06F 11/3664 |
| 2018/0027370 | A1 * | 1/2018 | Austraat | H04L 67/10 |
| | | | | 455/456.1 |
| 2018/0095652 | A1 * | 4/2018 | Branch | G06F 3/04847 |
| 2018/0307677 | A1 * | 10/2018 | Jiang | G06F 40/30 |
| 2018/0336574 | A1 * | 11/2018 | Mohan | G06Q 50/01 |
| 2019/0028362 | A1 * | 1/2019 | Kim | H04W 4/14 |
| 2019/0188804 | A1 * | 6/2019 | Parry | H04L 9/3239 |
| 2020/0065220 | A1 * | 2/2020 | Sobran | G06N 5/003 |
| 2020/0065685 | A1 * | 2/2020 | Chenny | G06F 16/2365 |
| 2020/0134095 | A1 * | 4/2020 | Weldemariam | G06F 16/9535 |
| 2021/0286705 | A1 * | 9/2021 | Carter | G06F 11/3612 |

* cited by examiner

Primary Examiner — Neeraj Sharma
(74) Attorney, Agent, or Firm — DLA Piper LLP (US)

(57) ABSTRACT

A processor may receive a social media post related to a monitored system. The processor may automatically process at least one element of the social media post by applying at least one natural language processing algorithm. The processor may determine a meaning of the social media post based on an output of the at least one natural language processing algorithm. The processor may automatically route the social media post to at least one recipient based on the meaning.

24 Claims, 5 Drawing Sheets

SYSTEM MONITORING BASED ON SOCIAL MEDIA

DETAILED DESCRIPTION OF SEVERAL EMBODIMENTS

Many network-based software systems may include one or more servers that may serve data to one or more clients over the network. For example, clients may communicate with servers using one or more application programming interfaces (APIs). Servers may provide software services to the clients, such as online applications for financial management, tax preparation, banking, and/or for any other purpose.

Occasionally, one or more problems may arise with the software services, such as bugs, crashes, slow and/or otherwise poor performance, or other issues. Developers of the software services and/or automatic processes may attempt to fix these issues as they become aware of them. The varied and unpredictable nature of client device and/or network hardware and/or software, as well as the varied and unpredictable nature of client user interactions with server-based software products through the network, presents the problem of making some issues difficult to detect by developers and/or automatic processes. This is a problem unique to the networked computing environment.

However, in another aspect unique to the networked computing environment, users may broadcast issues with online software services through various social media platforms (e.g., Twitter™, Facebook™, Instagram™, LinkedIn™, etc.). In order to quickly identify and address reported issues, some embodiments disclosed herein may be configured to monitor social media messages for mentions of issues with a software product, automatically determine the meaning of the messages, and automatically report the issues to appropriate parties and/or services based on the determined meaning. Some embodiments may therefore improve software error correction by gathering and interpreting social media information relevant to a software product, which may reveal problems and/or other issues that may not be otherwise detectable efficiently, if at all.

Figure 1:
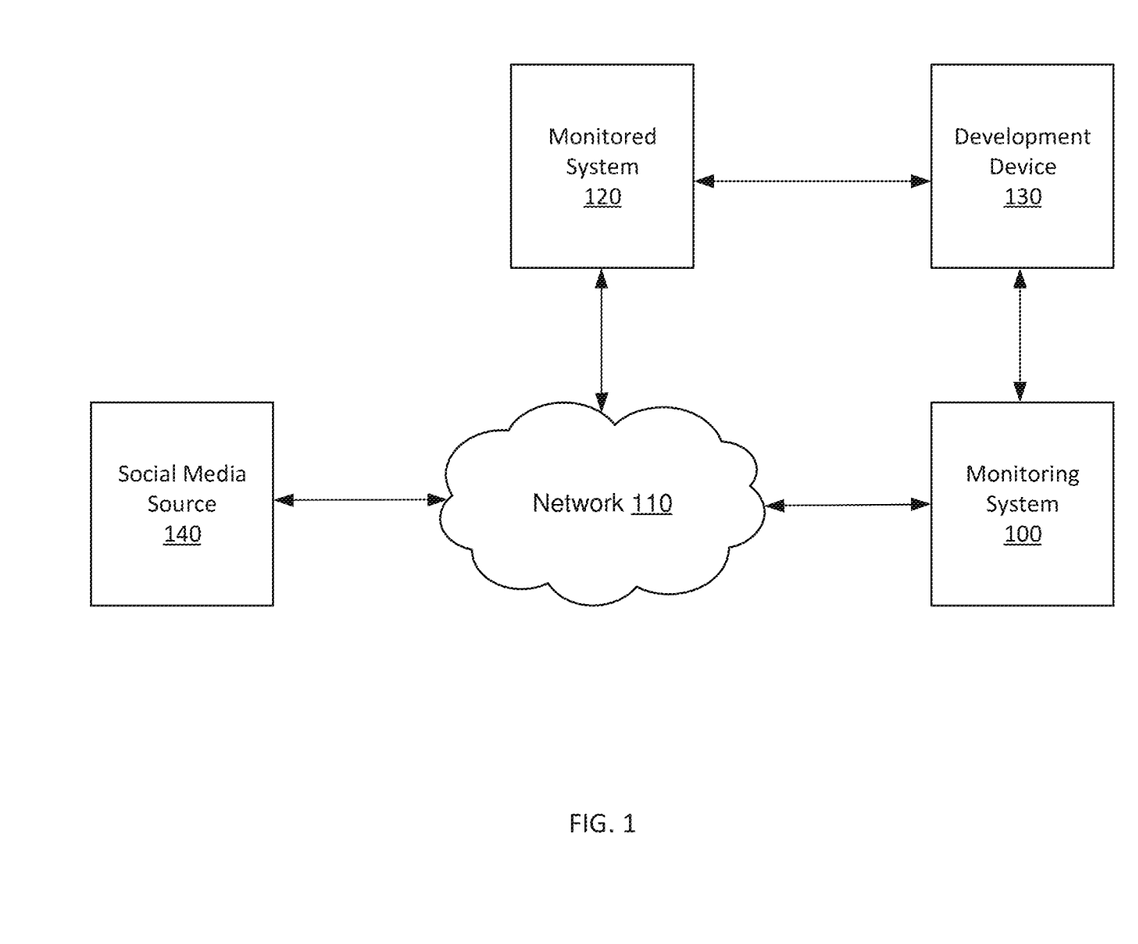
FIG. 1 shows a monitoring system according to an embodiment of the present disclosure.

FIG. 1 shows a monitoring system 100 configured to perform automatic monitoring of a monitored server 120 based on social media according to an embodiment of the present disclosure. As described below with respect to FIGS. 2 and 3, system 100 may include one or more hardware and/or software elements configured to perform automatic monitoring and/or classification.

System 100 may be configured to gather social media data from one or more social media sources 140. System 100 may include one or more computing devices (e.g., computing device 200 described below) which may be configured to monitor at least one social media source 140, such as Twitter™, Facebook™, Instagram™, LinkedIn™, etc. As described in detail below, system 100 may monitor social media sources 140 for indications of problems or other issues with one or more monitored systems 120 and may report the issues to at least one development device 130. Monitored systems 120 may include servers and/or other computing devices configured to provide software services to clients through network 110, for example. In some embodiments, monitored systems 120 may not be computers connected to network 110 at all, but may be any type of system with which a user may experience issues of any kind. Development device 130 may include one or more computing devices configured to troubleshoot monitored systems 120. While monitored systems 120 and development device 130 are illustrated as separate systems in FIG. 1, some embodiments may include monitored systems 120 and development devices 130 as combined elements.

Network 110 may be the Internet and/or other public or private networks or combinations thereof. In some embodiments, monitored systems 120 and clients may use network 110 for communication, and/or system 100 may use network 110 to gather social media data from social media sources 140. In some embodiments, communication between devices on network 110 may be facilitated by one or more application programming interfaces (APIs). APIs of system, monitored system 120, and/or development device 130 may be proprietary and/or may be examples available to those of ordinary skill in the art such as Amazon® Web Services (AWS) APIs or the like.

System 100, monitored system 120, development device 130, and social media source 140 are each depicted as single devices for ease of illustration, but those of ordinary skill in the art will appreciate that system 100, monitored system 120, development device 130, and/or social media source 140 may be embodied in different forms for different implementations. For example, system 100, monitored system 120, and/or development device 130 may include a plurality of devices. In another example, a plurality of social media sources 140 may be connected to network 110 and may be monitored by system 100. Furthermore, as noted above, network 110 may be a single network or a combination of networks, which may or may not all use similar communication protocols and/or techniques.

Figure 2:
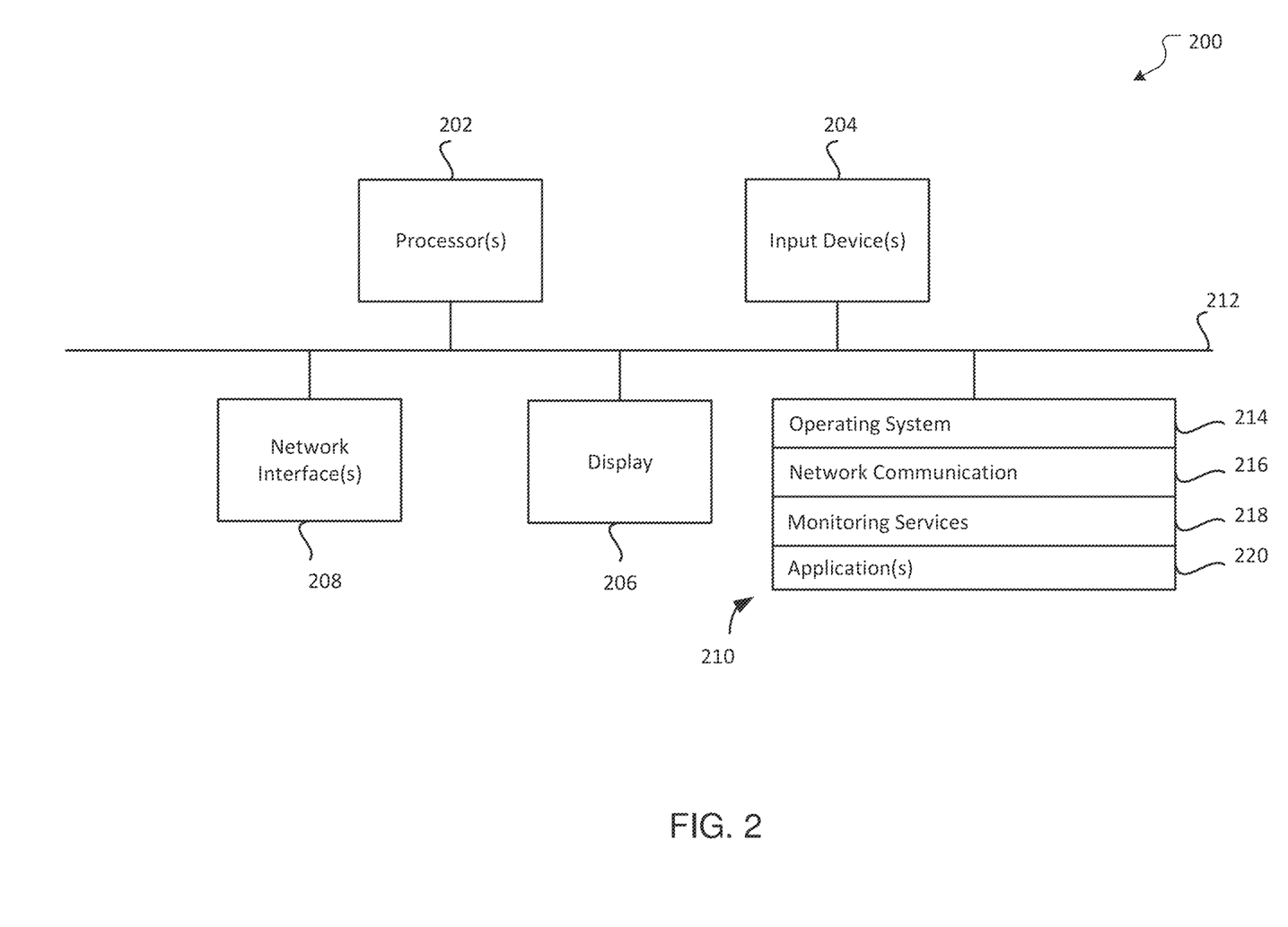
FIG. 2 shows a computing device according to an embodiment of the present disclosure.

FIG. 2 is a block diagram of an example computing device 200 that may implement various features and processes as described herein. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212, and in some embodiments, these components may be distributed across multiple physical locations and coupled by a network.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Monitoring service instructions 218 may include instructions that perform the various social media monitoring and issue classification and routing functions described below. In some embodiments, system 100 may include a plurality of computing devices 200, and different computing devices 200 may perform different subsets of the automatic production testing and/or validation functions using different portions of monitoring service instructions 218.

Application(s) 222 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
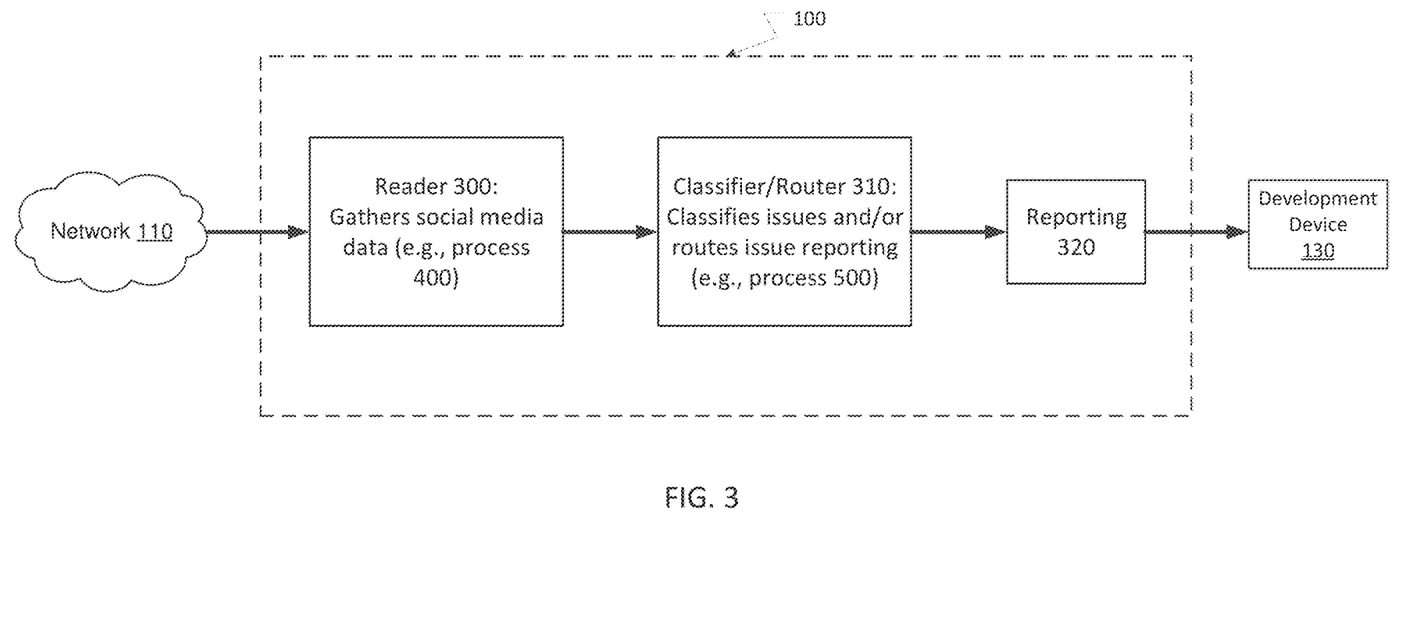
FIG. 3 shows a monitoring system according to an embodiment of the present disclosure.

FIG. 3 shows system 100 according to an embodiment of the present disclosure. System 100 may include a reader module 300, a classifier/router module 310, and/or one or more reporting modules 320. Modules 300-320 may be provided by monitoring service instructions 218 executed by processor 202 of computing device 200 that may be part of system 100, for example.

Reader module 300 may be configured to monitor social media sources 140 through network 110. For example, reader module 300 may monitor a specific social media source 140 (e.g., Twitter™) for incoming messages (e.g., tweets) directed to one or more social media accounts. Upon detection of a message, reader module 300 may capture data from the social media message and pass the data to classifier/router module 320. Example processing that may be performed by reader module 300 is described below with respect to FIG. 4. While a single reader module 300 is shown in FIG. 3 for clarity, some embodiments of system 100 may include multiple reader modules 300, and each reader module 300 may be configured to monitor a different social media source 140 and/or to look for different keyword(s).

Classifier/router module 310 may be configured to classify social media message data captured by reader module 300 and/or route the data and/or information describing the data to one or more reporting modules 320 based on the classifying. For example, classifier/router module 310 may process at least a portion of the social media message using a natural language processing algorithm. Classifier/router module 310 may then analyze at least a portion of the social media message and/or the output of the natural language processing algorithm to classify the message. In some embodiments, the analyzing may include using one or more machine learning algorithms. In some embodiments, the analyzing may include determining whether the message is describing a problem with monitored system 120 or not and/or may include determining what type of problem the message is describing. Classifier/router module 310 may identify one or more appropriate reporting modules 320 based on the determining. Classifier/router module 310 may send information about the problem to the identified reporting module(s) 320. Example processing that may be performed by classifier/router module 310 is described below with respect to FIG. 5.

Reporting module 320 may report the information determined by classifier/router module 310 to one or more developers (e.g., users) or automatic processes (collectively, "parties") for addressing issues with monitored system 120. In some embodiments, reporting module 320 may be configured to report the information to specific parties based on the outcome of processing by classifier/router module 310. While a single reporting module 320 is shown in FIG. 3 for clarity, some embodiments of system 100 may include multiple reporting modules 320, each configured to report to a specific party or set of parties. In this arrangement, classifier/router module 310 may provide the information to the specific reporting module 320 associated with the appropriate party or parties based on the determining.

Figure 4:
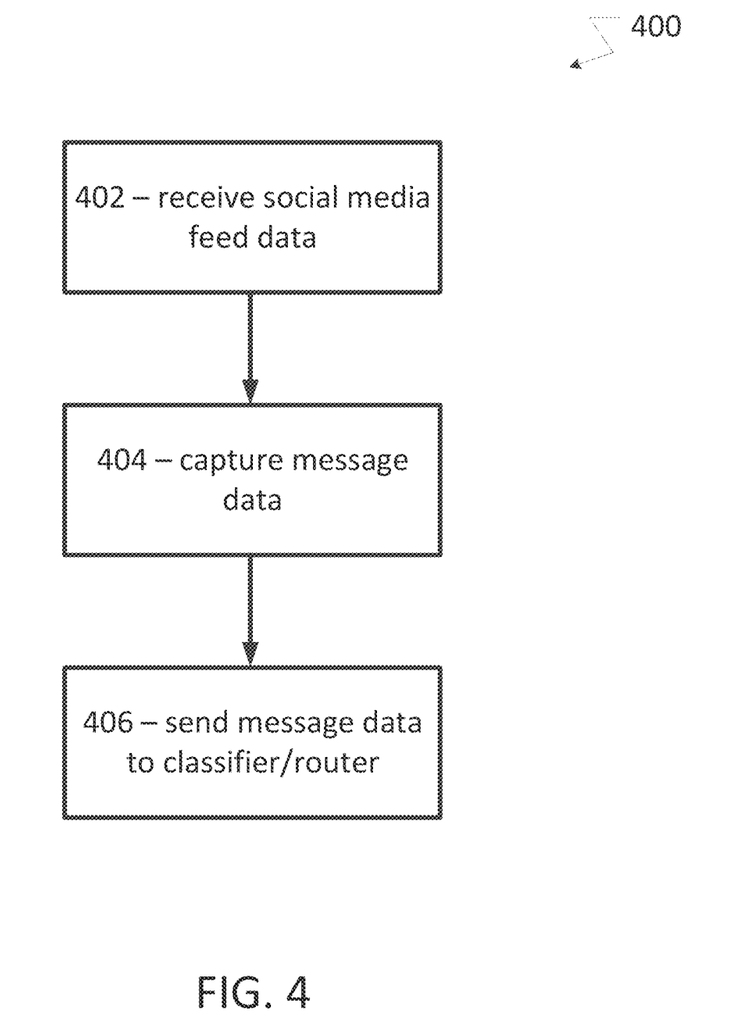
FIG. 4 shows a social media reading process according to an embodiment of the present disclosure.
Figure 5:
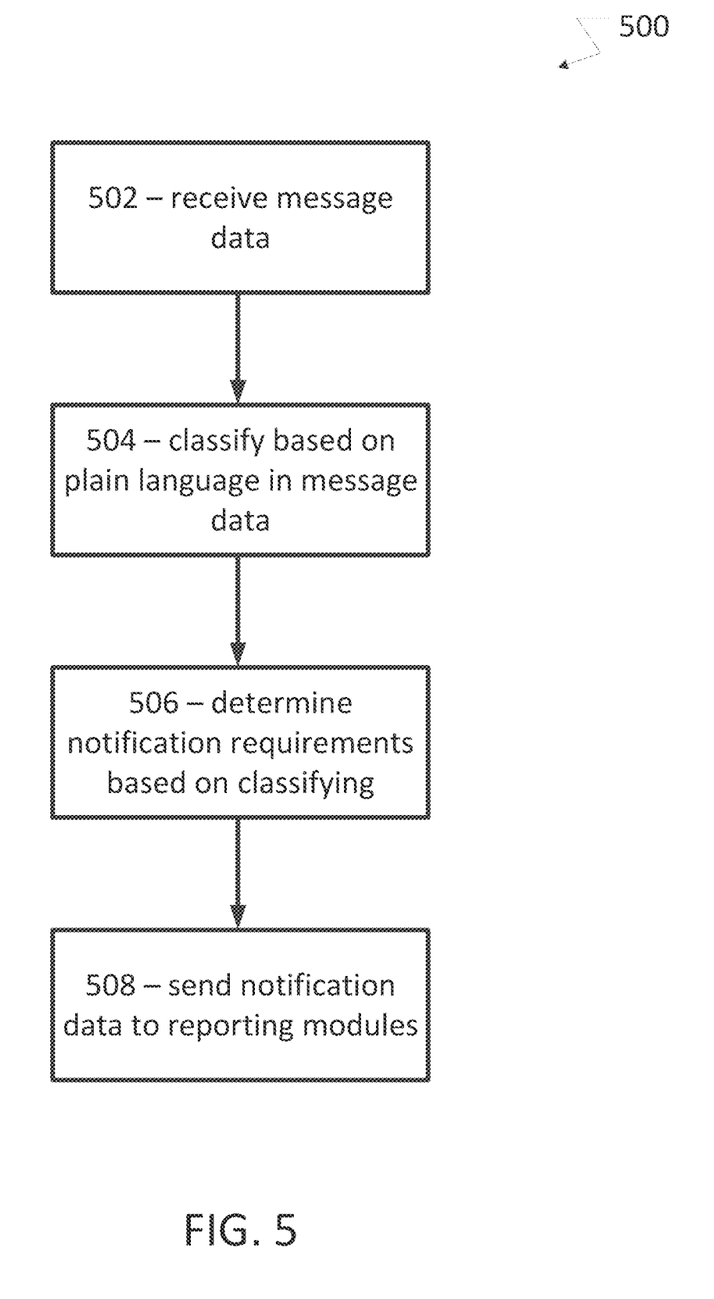
FIG. 5 shows a classification and/or routing process according to an embodiment of the present disclosure.

FIG. 4 shows a social media reading process 400 according to an embodiment of the present disclosure. System 100 may perform process 400 to detect social media messages about monitored system 120 and collect social media message data for further processing (e.g., by process 500 as described below). In some embodiments, reader module 300 may perform process 400.

At 402, reader module 300 may receive social media feed data. For example, reader module 300 may be configured to receive a stream of social media messages as they are posted by social media platform users. In some embodiments, reader module 300 may receive all messages sent to one or more social media accounts. Using Twitter™ as an example, reader module 300 may receive all tweets including a particular account identifier or identifiers (e.g., @mint, @mintcares, @QBO, or any other identifier).

At 404, reader module 300 may capture data from each social media message, and at 406, reader module 300 may send the captured data to classifier/router module 320. For example, reader module 300 may capture and store the entire content of the messages including the identifier or identifiers (e.g., the full text of a tweet) in system 100 memory (e.g., memory 210), where it may be used by classifier/router module (e.g., in process 500 described below). In some embodiments, reader module 300 may also capture metadata associated with each social media message. For example, reader module 300 may capture the poster's username/handle or other contact information, number of followers or friends/connections, time of post, location from which post was made, etc.

In a specific example, reader module 300 may be configured to receive tweets including "@mint." At 402, reader module 300 may receive the following tweet posted by user @JohnnyUtah at 4:09 AM from Bells Beach, Victoria, Australia: "Hey @mint, I can't log into my account!" At 404, reader module 300 may capture the text "Hey @mint, I can't log into my account!" and/or metadata including the sender's user handle (@JohnnyUtah), the number of followers of the sender (9), the time at which the tweet was posted (04:09 GMT+11:00), and the location from which the tweet was posted (Bells Beach, Victoria, Australia). At 406, reader module 300 may store the captured text and metadata for use by classifier/router module 320.

Because social media reading process 400 may capture data from all social media messages addressed to certain recepients and/or including certain identifiers, reader module 300 may continuously monitor for new messages in some embodiments. Accordingly, reader module 300 may repeat 402-406 continuously or periodicially, for example capturing each new message as it is posted or periodically receiving batches of messages to capture.

FIG. 5 shows a classification and/or routing process 500 according to an embodiment of the present disclosure. System 100 may perform process 500 to classify information about monitored system 120 (e.g., as gathered by process 400 described above) and route the information to appropriate parties based on the classifying. In some embodiments, classifier/router module 310 may perform process 500.

At 502, classifier/router module 310 may receive captured data from reader module 300. For example, reader module 300 may capture message content using process 400 as described above. Classifier/router module 310 may retrieve the captured data from system 100 memory (e.g., memory 210) as it is added or periodically.

At 504, classifier/router module 310 may classify the captured data. For example, classifier/router module 310 may analyze each message's content to determine whether it indicates a problem with monitored system 120 and, in some embodiments, what type of problem is indicated. Classifier/router module 310 may apply one or more natural language processing algorithms to at least a portion of the message content. The message and/or the output of the natural language processing may be analyzed to determine a meaning. Through this processing, classifier/router module 310 may detect one or more words, phrases, or other indicators that the message suggests a possible problem with monitored system 120. Applying natural language processing to messages posted by real world users to social media may allow classifier/router module 310 to interpret messages even if typos or other errors exist and/or to discern complex and/or specific meanings from messages automatically.

For example, classifier/router module 310 may analyze the following message: "Hey @mint, I can't log into my account!" In some embodiments, because the message was captured by reader module 300 due to the "@mint" identifier, it may be assumed to apply to monitored system 120, which may provide a software product called "Mint." In other embodiments, reader module 300 may record messages for multiple identifiers, which may or may not be related (e.g., @mint for the Mint product and @QBO for a software product called "QBO"). Classifier/router module 310 may determine, because the message includes "@mint,"

that the message relates to the Mint product rather than the QBO product. Classifier/router module 310 may determine that the message relates to a problem with monitored system 120 based on the phrase "I can't log into my account" or a portion thereof. In some embodiments, classifier/router module 310 may determine a problem classification (e.g., the problem is related to account access).

To determine the meaning of a message as described in the previous example, classifier/router module 310 may apply one or more natural language classifying algorithms. For example, classifier/router module 310 may use Word2Vec, which may include converting words in the message to vectors and determining vector similarities to known words in a defined Word2Vec vector space. Classifier/router module 310 may use Naïve Bayes classification, which may include converting words in the message to vectors and determining vector similarities to known words in a trained model and, in some embodiments, continually adding to the model training with new incoming message data. In other embodiments, other algorithms may be used. In some embodiments, clasifer/router module 310 may maintain its own model and/or training data, while in other embodiments, classifier/router module 310 may utilize an external service providing classification algorithm processing (e.g., an external simple machine learning service (SMLS) endpoint accessible to classifier/router module 310).

By using one or more classifying algorithms, classifier/router module 310 may determine similarities between a word or phrase and one or more known words or phrases. For example, in the previous message, "I can't" may appear frequently in messages indicating problems in the trained model. Classifier/router module 310 may recognize this similarity and determine that the message indicates a problem. If the message instead read "I love @mint," classifier/router module 310 may fail to determine any similarities between any words or phrases in the message and known words indicating problems.

In some embodiments, classifier/router module 310 may further classify the nature of the problem. For example, "log into" and/or "account" may appear frequently in messages indicating problems with account access. Classifier/router module 310 may recognize this similarity and determine that the message relates to account access. If the message instead read "my @mint session crashed and my data is gone," classifier/router module 310 may identify one or more different problems in the same way (e.g., problems related to a crash and/or data missing). In some embodiments, classifier/router module 310 may use separate algorithms to perform the initial classifying and the further classifying. For example, classifier/router module 310 may compare the message to a Naïve Bayes model to determine the message indicates a problem and compare messages indicating problems to a Word2Vec model to determine more specific problem types.

The use of similarity classification algorithms (e.g., Naïve Bayes and/or Word2Vec) may allow classifier/router module 310 to determine meanings even when the message includes errors. For example, if the message reads "Hey @mint, I cn't log into my acc0unt!", classifier/router module 310 may recognize "cn't" as similar to "can't" and/or "acc0unt" as similar to "account," and therefore classifier/router module 310 may still determine that the message has a similar meaning to its grammatically correct counterpart (e.g., "Hey @mint, I can't log into my account!").

At 506, classifier/router module 310 may determine one or more notification requirements based on the classification and/or other data. For example, classifier/router module 310 may determine that a message should be directed to one or more problem-solving recipients (e.g., developers) if the message indicates a problem, or that the message should be directed to one or more general recipients (e.g., general feedback) if the message does not indicate a problem. For embodiments where classifier/router module 310 determines a problem type, classifier/router module 310 may determine that a message should be directed to one or more subsets of problem-solving recipients focused on that problem type.

In some embodiments, classifier/router module 310 may use metadata gathered by reader module 300 to determine the notification requirements. For example, for the tweet sent by @JohnnyUtah, with 9 followers, at 4:09 AM from Bells Beach, Victoria, Australia classifier/router module 310 may use the metadata to determine a magnitude of the message based on the followers and/or the time. For example, a tweet by a user with many followers and/or at a peak use time may get higher priority (and therefore may be sent to more or different recipients) than a tweet by a user with few followers and/or at an off-peak time. Thus, the tweet from @JohnnyUtah may be given a lower magnitude than a similar tweet made at 6:00 PM by @Bodhi, a user with 24,000 followers. In some embodiments, classifier/router module 310 may determine a recipient based on the location, for example determining that the message sent by @JohnnyUtah should be directed to one or more problem-solving recipients in Australia or assigned to Australia.

At 508, classifier/router module 310 may send data to one or more reporting modules 320 based on the processing at 506. In some embodiments, system 100 may include separate reporting modules 320 for separate sets of users (e.g., there may be a reporting module 320 for problem solving users in Australia and/or a reporting module 320 for users solving account access problems, in addition to other reporting modules 320). In this case, classifier/router module 310 may send data to a reporting module 320 matching the characteristics determined at 506. In some embodiments, system 100 may include separate reporting modules 320 for separate communication channels. For example, as described below, reporting modules 320 may use a variety of notification techniques (e.g., metrics-based reporting, alerts, conversation notifications, etc.). Each technique may have its own reporting module 320, which may be configured to deliver an alert to an appropriate set of users. In still other embodiments, there may be a single reporting module 320 or plurality of general-purpose reporting modules 320, each of which may be configured to report to users as directed by classifier/router module 310.

Reporting module 320 may report based on the processing by classifer/router module 310 in a variety of ways. For example, reporting module 320 may be configured to provide data to a Wavefront™ monitoring system or other dashboard monitoring system. In this example, reporting module 320 may communicate with the Wavefront™ monitoring system, which may be part of development environment 130, through an API or other system. Reporting module 320 may provide message content and/or at least a portion of the metadata to the Wavefront™ monitoring system, which may plot messages as time-series events. In some embodiments, messages may be plotted by severity based on a number of followers or friends of the message sender (e.g., a message from a sender with 9 followers may be less severe than a message from a sender with 24,000 followers). For any message classified as a problem, the Wavefront™ monitoring system may generate an alert that may be send to subscribing developer users and/or subscribing automated processes. Subscribers may subscribe to appropriate feeds (e.g., troubleshooting developer users may subscribe to receive all problem messages, developer users who work on account access problems may subscribe to receive all messages related to account access, etc.).

In another example, reporting module 320 may be configured to provide data to a Slack™ messaging system or other messaging system. For example, reporting module 320 may post alerts and/or additional information (e.g., including the message, metadata, and/or portions thereof) in an appropriate Slack™ channel (e.g., a "problem" channel for messages classified as problems, an "account access" channel for messages classified as account access problems, a "general" channel for messages classified as not problems, etc.). Users and/or automated processes may subscribe to channels relevant to their roles to receive the alerts and/or additional information through the channels.

Based on the data gathering by reader module 300, the analysis by classifier/router module 310, and the notifying by reporting module 320, system 100 may directly and automatically convert social media messages into actionable problem alerts for correcting problems with monitored system 120. Accordingly, system 100 may improve software error correction by gathering and interpreting social media information relevant to a software product in a fully automatic manner, which may reveal problems and/or other issues that may not be otherwise detectable efficiently, if at all.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method for identifying issues with a monitored system comprising:
    receiving, a social media post related to the monitored system, the social media post received from a reader interacting with a social media source;
    generating, based on processing at least one element of the social media post with at least one natural language processing algorithm, an output of the at least one natural language processing algorithm, wherein the at least one natural language processing algorithm includes at least one of a Naïve Bayes classifier or a Word2Vec algorithm;
    automatically determining a meaning of the social media post based on the output;
    identifying, based on the meaning, a problem with a performance stability of a component of the monitored system that supports a software product;
    selecting at least one recipient for the social media post based on the problem with the monitored system; and
    routing the social media post to the at least one recipient in order to troubleshoot the problem with the performance stability of the component of the monitored system.

2. The method of claim 1, wherein the receiving includes receiving a stream of social media posts directed to a social media recipient.

3. The method of claim 1, wherein the identifying includes classifying the social media post as reporting a problem with the monitored system described by the at least one natural language element.

4. The method of claim 1, wherein the identifying includes identifying a specific problem with the monitored system described by the at least one natural language element.

5. The method of claim 4, wherein the classifying the social media post as reporting the problem with the monitored system and the identifying a specific problem with the monitored system are performed using different natural language processing algorithms.

6. The method of claim 5, wherein:
    the natural language processing algorithm used to classify the social media post as reporting the problem with the monitored system includes a Naïve Bayes classifier; and
    the natural language processing algorithm used to identify the specific problem with the monitored system includes a Word2Vec algorithm.

7. The method of claim 1, further comprising extracting, by the processor, metadata from the social media post, wherein the routing is further based on at least a portion of the metadata.

8. The method of claim 7, wherein the metadata includes at least one of a name of a user who created the social media post, a time at which the social media post was created, a location of the user who created the social media post, and a number of social media connections to the user who created the social media post.

9. The method of claim 7, wherein determining the meaning further includes determining a severity of the meaning based at least in part on the metadata.

10. The method of claim 1, wherein the routing includes sending an alert to the at least one recipient.

11. The method of claim 1, wherein the routing includes plotting data describing the social media post on a display provided to the at least one recipient, sending the at least one natural language element to the at least one recipient, or a combination thereof.

12. The method of claim 1, wherein the monitored system includes at least one server configured to provide at least one software service through at least one network.

13. A system for identifying issues with a monitored system comprising:
    a transceiver; and
    a processor in communication with the transceiver and configured to:

receive, by the transceiver, a social media post related to the monitored system, the social media post received from a reader that interacts with a social media source;

generate, based on processing at least one element of the social media post with at least one natural language processing algorithm, an output of the at least one natural language processing algorithm, wherein the at least one natural language processing algorithm includes at least one of a Naïve Bayes classifier or a Word2Vec algorithm;

automatically determine a meaning of the social media post based on the output;

identify, based on the meaning, a problem with a performance stability of a component of the monitored system that supports a software product;

select at least one recipient for the social media post based on the problem with the monitored system; and automatically route the social media post to the at least one recipient in order to troubleshoot the problem with the performance stability of the component of the monitored system.

14. The system of claim 13, wherein the processor is configured to receive the social media post within a stream of social media posts directed to a social media recipient.

15. The system of claim 13, wherein the identifying includes classifying the social media post as reporting a problem with the monitored system described by the at least one natural language element.

16. The system of claim 13, wherein the identifying includes identifying a specific problem with the monitored system described by the at least one natural language element.

17. The system of claim 16, wherein the processor uses different natural language processing algorithms for the classifying the social media post as reporting the problem with the monitored system and the identifying a specific problem with the monitored system.

18. The system of claim 17, wherein:
the natural language processing algorithm used to classify the social media post as reporting the problem with the monitored system includes a Naïve Bayes classifier; and
the natural language processing algorithm used to identify the specific problem with the monitored system includes a Word2Vec algorithm.

19. The system of claim 13, wherein:
the processor is further configured to extract metadata from the social media post; and
the routing is further based on at least a portion of the metadata.

20. The system of claim 19, wherein the metadata includes at least one of a name of a user who created the social media post, a time at which the social media post was created, a location of the user who created the social media post, and a number of social media connections to the user who created the social media post.

21. The system of claim 19, wherein the processor is configured to determine the meaning by a process including determining a severity of the meaning based at least in part on the metadata.

22. The system of claim 13, wherein the processor is configured to route the social media post by sending an alert to the at least one recipient.

23. The system of claim 13, wherein the processor is configured to route the social media post by plotting data describing the social media post on a display provided to the at least one recipient, sending the at least one natural language element to the at least one recipient, or a combination thereof.

24. The system of claim 13, wherein the monitored system includes at least one server configured to provide at least one software service through at least one network.

* * * * *